United States Patent
Bourdon et al.

(10) Patent No.: US 8,094,286 B2
(45) Date of Patent: Jan. 10, 2012

(54) METHOD AND DEVICE FOR PROCESSING A SEQUENCE OF SOURCE PICTURES

(75) Inventors: Pascal Bourdon, Le Grand Fougeray (FR); Sylvain Thiebaud, Noyal sur Vilaine (FR); Didier Doyen, La Bouexiere (FR)

(73) Assignee: Thomson Licensing, Boulogne-Billancourt (FR)

( * ) Notice: Subject to any disclaimer, the term of this patent is extended or adjusted under 35 U.S.C. 154(b) by 343 days.

(21) Appl. No.: 12/312,968

(22) PCT Filed: Dec. 4, 2007

(86) PCT No.: PCT/EP2007/063284
§ 371 (c)(1),
(2), (4) Date: Jun. 2, 2009

(87) PCT Pub. No.: WO2008/068255
PCT Pub. Date: Jun. 12, 2008

(65) Prior Publication Data
US 2010/0053431 A1 Mar. 4, 2010

(30) Foreign Application Priority Data
Dec. 6, 2006 (EP) .................................. 06301220

(51) Int. Cl.
*H03L 7/00* (2006.01)
(52) U.S. Cl. ................ 352/40; 352/90; 380/201
(58) Field of Classification Search .................... 352/39, 352/40, 44, 48, 85, 90, 130, 236, 244; 380/200, 380/201; 359/237, 238
See application file for complete search history.

(56) References Cited

U.S. PATENT DOCUMENTS

| | | | | |
|---|---|---|---|---|
| 7,030,956 | B2 * | 4/2006 | Nishi et al. | 352/85 |
| 7,043,019 | B2 * | 5/2006 | Tehranchi et al. | 380/218 |
| 7,702,129 | B2 * | 4/2010 | Kervec et al. | 382/100 |
| 7,822,202 | B2 * | 10/2010 | Bourdon et al. | 380/210 |
| 2003/0063361 | A1 * | 4/2003 | Ohnishi et al. | 359/237 |
| 2005/0047595 | A1 * | 3/2005 | Chupp et al. | 380/210 |

(Continued)

FOREIGN PATENT DOCUMENTS
EP 1237369 9/2002
(Continued)

OTHER PUBLICATIONS
Search Report Dated Mar. 14, 2008.

*Primary Examiner* — William C Dowling
(74) *Attorney, Agent, or Firm* — Tutunjian & Bitetto, P.C.

(57) ABSTRACT

The invention relates to a method for combating the copying of source pictures by means of a camera while they are being displayed, for example using a camcorder in a movie theatre. To this end, it is known, in classical projection systems, to modulate by a carrier wave the brightness of some pixels of the pictures. The frequency of the carrier wave is usually constant and generally half the refresh frequency. The main problem with such systems is that once a pirate has figured out what the modulation frequency is, he can configure his camcorder shutter to filter out this frequency and bypass the anti-camcorder method. According to the invention, the frequency of the carrier is changed at least once throughout the displaying of the sequence pictures or the movie, to defeat all camcorders standards (PAL/NTSC) and shutter configurations.

9 Claims, 4 Drawing Sheets

U.S. PATENT DOCUMENTS

| | | | |
|---|---|---|---|
| 2006/0029252 A1* | 2/2006 | So | 382/100 |
| 2006/0093326 A1* | 5/2006 | Tan et al. | 386/94 |
| 2007/0212024 A1* | 9/2007 | Bourdon et al. | 386/94 |
| 2010/0027968 A1* | 2/2010 | Bourdon et al. | 386/94 |
| 2011/0064218 A1* | 3/2011 | Willis | 380/210 |

FOREIGN PATENT DOCUMENTS

| | | |
|---|---|---|
| EP | 1301034 | 4/2003 |
| EP | 1487201 | 12/2004 |
| WO | WO 2005/027529 | 3/2005 |

* cited by examiner

METHOD AND DEVICE FOR PROCESSING A SEQUENCE OF SOURCE PICTURES

This application claims the benefit, under 35 U.S.C. §365 of International Application PCT/EP2007/063284, filed Dec. 4, 2007, which was published in accordance with PCT Article 21(2) on Jun. 12, 2008 in English and which claims the benefit of European patent application No. 06301220.7, filed Dec. 6, 2006.

FIELD OF INVENTION

The invention relates to a method and a device for processing a sequence of source pictures. More specifically, it relates to ways of preventing illegal copy of video pictures.

BACKGROUND OF THE INVENTION

The visual contents, whether these be fixed or moving pictures, are in general creations that benefit from guarantees of exclusivity associated with the creator's rights. Their reproduction is in general permitted only within a strictly defined framework that allows the creators and their beneficiaries to be remunerated.

To ensure that these legal rules are complied with correctly, many systems have been developed to prevent illegal copies or to make the quality of the copies sufficiently degraded to make them unusable.

Within this context, the patent application WO 05/027529 aims to combat the copying of source pictures by means of a camera while they are being displayed, for example using a camcorder in a movie theatre. In this document, it is proposed to generate, from each source picture of the sequence to be displayed, at least two successive processed pictures, in which the colour of at least one pixel in the processed pictures is modulated temporally around the colour of the pixel in the source picture and to display these processed pictures. The pixels whose colour is modified represent an anti-piracy message. The processed pictures are displayed at a high frequency that makes the message invisible to the human eye but visible in the sequence filmed by the camcorder. Such a solution requires a modulation of the colour of the pixels at a frequency higher than the critical flicker frequency, which is of around 10/20 or 50/60 Hz depending on the flicker characteristics, and therefore applies only to projection systems having a high refresh frequency, at least of around 100 Hz. It is also possible to modulate the luminance or the brightness of the pixels instead of their colour.

In such projection systems, the modulation frequency is constant and is generally half the refresh frequency. The main problem with such systems is that once a pirate has figured out what the modulation frequency is, he can configure his camcorder shutter to filter out this frequency and bypass the anti-camcorder method.

SUMMARY OF THE INVENTION

The present invention aims at alleviating this drawback of the prior art.

For this purpose, the invention proposes a video processing method wherein the modulation frequency is changed at least once throughout the displaying of the sequence pictures or the movie, to defeat all current camcorders standards (e.g. PAL/NTSC) and shutter configurations.

The invention relates to a method for processing a sequence of source video pictures by generating, from each source picture, at least two successive processed video pictures, in which the brightness of at least one pixel in the processed video pictures is modulated temporally around the brightness of the pixel in the source video picture by a carrier wave at a frequency called modulation frequency. According to the invention, the modulation frequency of the carrier wave changes at least once throughout the generation of the processed video pictures of the sequence.

In a specific embodiment, the modulation frequency changes periodically. For example, the modulation frequency changes at each period of N source video pictures with $N \geq 1$.

Otherwise, the number of modulation frequencies can be greater or equal to 2. In a specific embodiment, this number is 2 and, in that case, the modulation frequency changes alternately between a first modulation frequency and a second modulation frequency. These two modulation frequencies are advantageously selected to generate an aliasing for two different sampling frequencies of video capturing device when the processed video pictures are captured by said video capturing device. For example, the first modulation frequency is selected to generate an aliasing at a frequency $f_a$ for a sampling frequency of 50 Hz (interleaved PAL) and the second modulation frequency is selected to an aliasing at the same frequency $f_a$ for a sampling frequency of 60 Hz (interleaved NTSC).

In another embodiment, the modulation frequency changes progressively, for example, according a sine curve.

In practice, the generation of processed video pictures comprises
- duplicating each source picture for generating, for each source video picture, at least two consecutive video pictures identical to the source picture, and
- modulating said at least two consecutive video pictures by the carrier wave.

The phase of the carrier wave, for each modulation frequency, is preferably selected in order to maximize the carrier wave energy over the time period where the modulation frequency is said modulation frequency.

The invention relates also to a device for processing a sequence of source video pictures comprising a generator for generating, from each source video picture, at least two successive processed video pictures, in which the brightness of at least one pixel in the processed video pictures is modulated temporally around the brightness of the pixel in the source video picture by a carrier wave at a frequency called modulation frequency. According to the invention, the generator comprises means for changing the modulation frequency at least once throughout the generation of the processed video pictures.

BRIEF DESCRIPTION OF THE DRAWINGS

Exemplary embodiments of the invention are illustrated in the drawings and are explained in more detail in the following description. In the drawings.

DESCRIPTION OF PREFERRED EMBODIMENTS

The anti-camcorder method as defined in the prior art is based on a colour or brightness modulation in which two output pictures $I_1$ and $I_2$ are generated from one single source picture $I_0$ in which, for each pixel P, $I_0(P)=[I_1(P)+I_2(P)]/2$ where $I_x(P)$ designates the brightness value of the pixel P in the picture $I_x$ and where $I_1(P) \neq I_0(P)$ and $I_2(P) \neq I_0(P)$.

Figure 1:
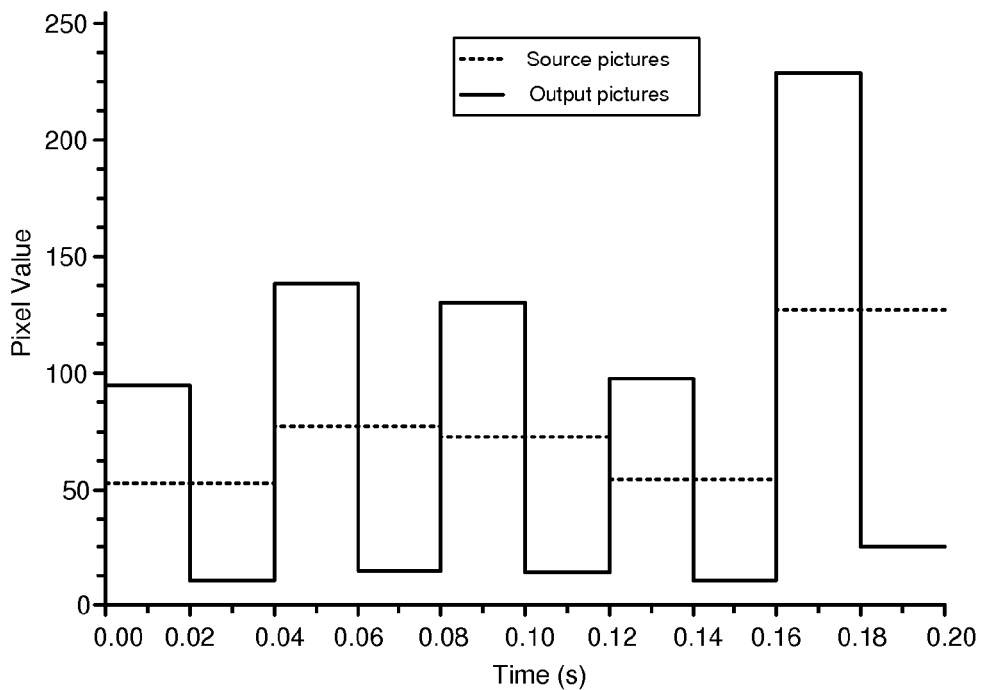
FIG. 1 illustrates the brightness of source pictures and output pictures after anti-camcorder processing over time according to prior art.

FIG. 1 illustrates such a method. More particularly, FIG. 1 shows the evolution of the brightness value (pixel value) of a pixel in a sequence of source pictures at 25 Hz and its evolution in the corresponding output pictures at 50 Hz. The source pictures are drawn in dotted lines and the output pictures in solid line.

This brightness modulation is the particular case of a more general continuous amplitude modulation such as $$I(t)=I_0 \cdot (1+m \cdot \cos(2\pi \cdot fm \cdot t + \phi)) \quad (1)$$

where $I(t)$ is the modulated picture, $I_0$ is a source picture, $m \in [0,1]$ is the modulation index and fm is the modulation frequency.

Therefore, for each source picture $I_0$, the discrete form ($t=k/F_r'$) of this modulation generates $K=F_r'/F_r$ output pictures, where $F_r$ is the refresh frequency of the source pictures and $F_r'$ is the refresh frequency of the output pictures. $F_r'$ has to be higher than $F_r$ and is preferably a multiple of $F_r$ to bypass synchronization issues.

In the case of current "1-to-2 frames" anti-camcorder method illustrated by FIG. 1, this model generates K=2 output pictures $I_1$ and $I_2$ with a modulation frequency $fm=F_r'/2=F_r$, as illustrated on FIG. 2 and demonstrated in the following equation:

$$I_k = I\left(t = \frac{k}{F_r'}\right) = I_0 \cdot \left(1 + m \cdot \cos\left(2\pi \cdot \frac{F_r'}{2} \cdot \frac{k}{F_r'} + \varphi\right)\right)$$

$$\Rightarrow I_k = I_0 \cdot (1 + m \cdot \cos(\pi \cdot k + \varphi))$$

$$\Rightarrow I_k = I_0 \cdot (1 + m \cdot [\cos(\pi \cdot k) \cdot \cos(\varphi) - \sin(\pi \cdot k) \cdot \sin(\varphi)])$$

$$\Rightarrow I_k = I_0 \cdot (1 + m \cdot (-1)^k \cdot \cos(\varphi))$$

$$\Rightarrow \begin{cases} I_1 = I_{k=1} = I_0 \cdot (1 - m \cdot \cos(\varphi)) \\ I_2 = I_{k=2} = I_0 \cdot (1 + m \cdot \cos(\varphi)) \end{cases}$$

where the condition $I_0=(I_1+I_2)/2$ is still verified.

Figure 2:
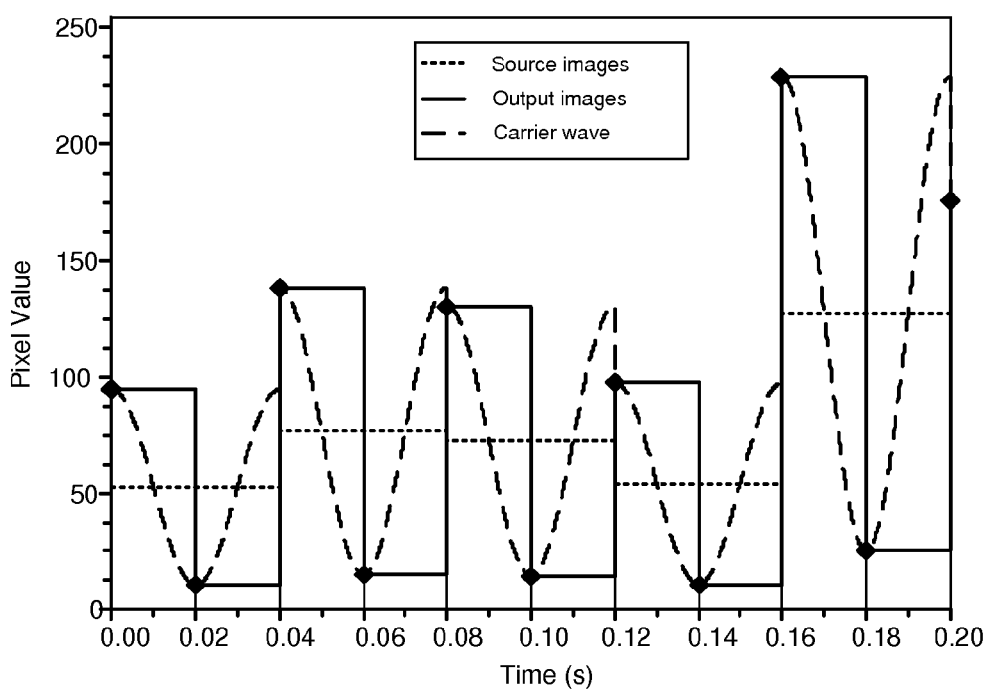
FIG. 2 shows the carrier wave used to modulate some pixels of the source pictures and generate the output pictures of FIG. 1.

FIG. 2 shows the carrier wave (in dashed line) used to modulate the brightness of the pixels. The rhomb points on the carrier wave show the samples of the carrier wave used to generate the output pictures. The frequency of the carrier wave which is the modulation frequency fm, is equal to $F_r'/2=F_r$ as indicated above and the sampling frequency is equal to the refresh frequency $F_r'$.

According to the invention, it is proposed to change the modulation frequency fm at least once throughout the displaying of the sequence of output pictures, for example throughout a movie, to defeat all camcorders standards (PAL/NTSC) and shutter configurations.

In a first embodiment, the modulation frequency fm changes periodically, for example at each period of N source pictures with $N \geq 1$ and it sweeps between at least two modulation frequencies. Advantageously, N is equal or greater than 8 to have a reduced bandwidth for the modulated signal.

Figure 3:
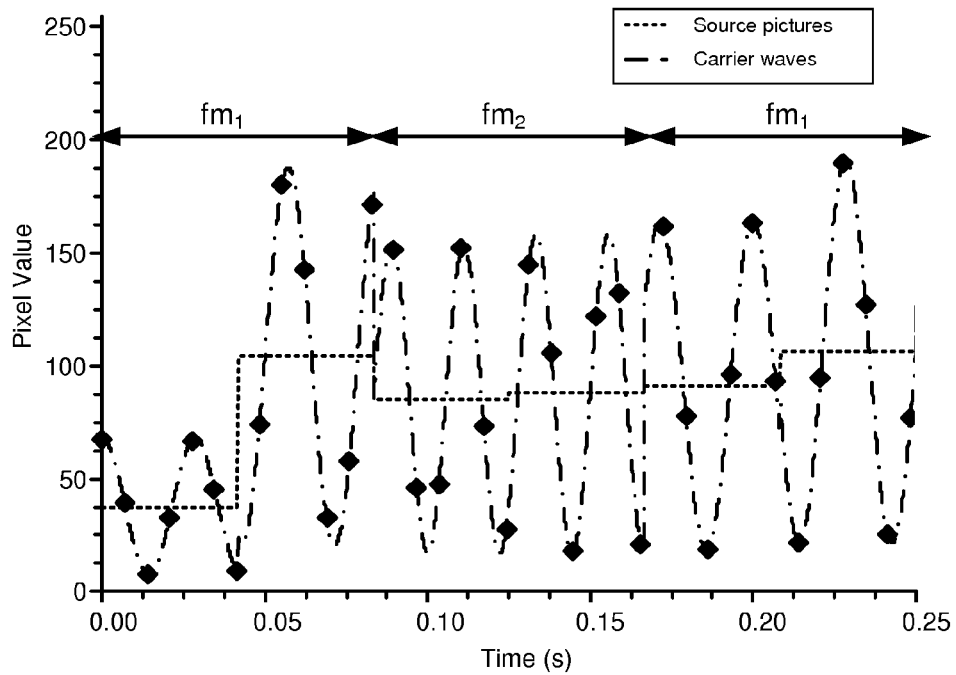
FIG. 3 illustrates the brightness of source pictures over time and the carrier wave used in a first embodiment of the invention.
Figure 4:
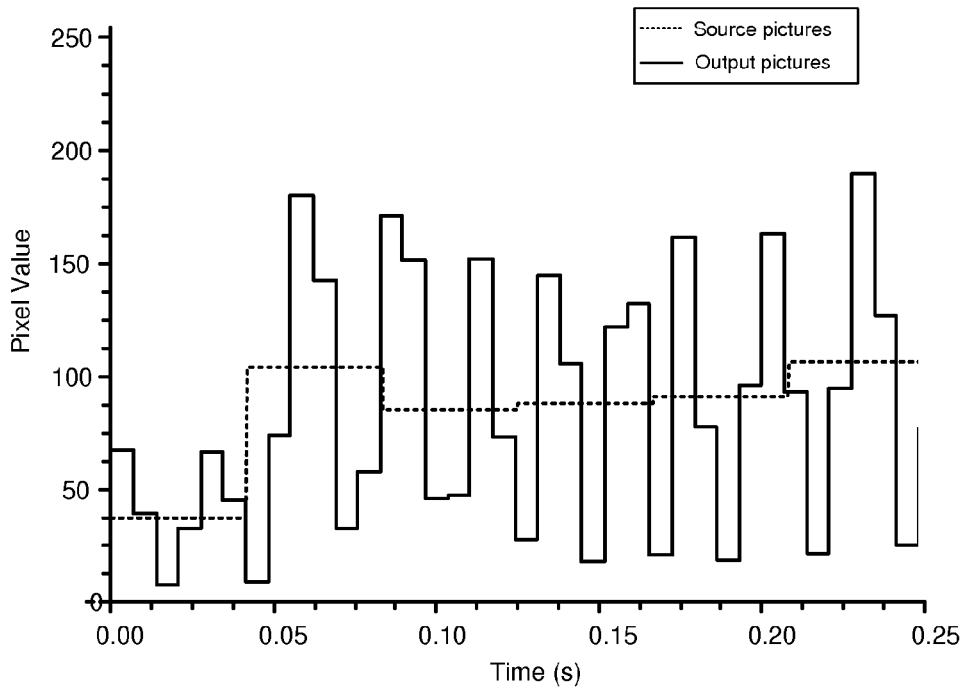
FIG. 4 shows the output pictures generated by using the carrier wave of FIG. 3.

In the example illustrated by FIGS. 3 and 4, the modulation frequency fm (or carrier wave frequency) changes every two picture periods of the sequence of source pictures, i.e. every 83 ms for a refresh frequency $F_r=24$ Hz and the frequency is set alternately to $fm_1$ and $fm_2$. In this example, $fm_1=35$ Hz and $fm_2=45$ Hz. A frequency change period of two source pictures has been chosen in FIGS. 3 and 4 for clarity reasons but this period is advantageously higher as mentioned before. The FIG. 3 shows the brightness (pixel value) of the source pictures (dotted line) over time and the carrier waves (dashed line) used to modulate the brightness of some pixels of the source pictures. The FIG. 4 shows the resulting output pictures (solid line) for a refresh frequency (or picture frequency) $F_r'=144$ Hz. The two modulation frequencies $fm_1$ and $fm_2$ are selected to generate an aliasing at a frequency $f_a$ for a first sampling frequency $fs_1$ and a second sampling frequency $fs_2$. So, for example, $fm_1=fs_1-f_a$ and $fm_2=fs_2+f_a$. In the example of FIG. 3, $fs_1=50$ Hz (interleaved PAL), $fs_2=60$ Hz (interleaved NTSC) and $f_a=15$ Hz.

The modulation frequencies used can be independent of the refresh frequency $F_r'$ of the output pictures because the continuity of the carrier wave is maintained throughout the display of the pictures (no cut in the phase of the carrier wave).

Figure 5:
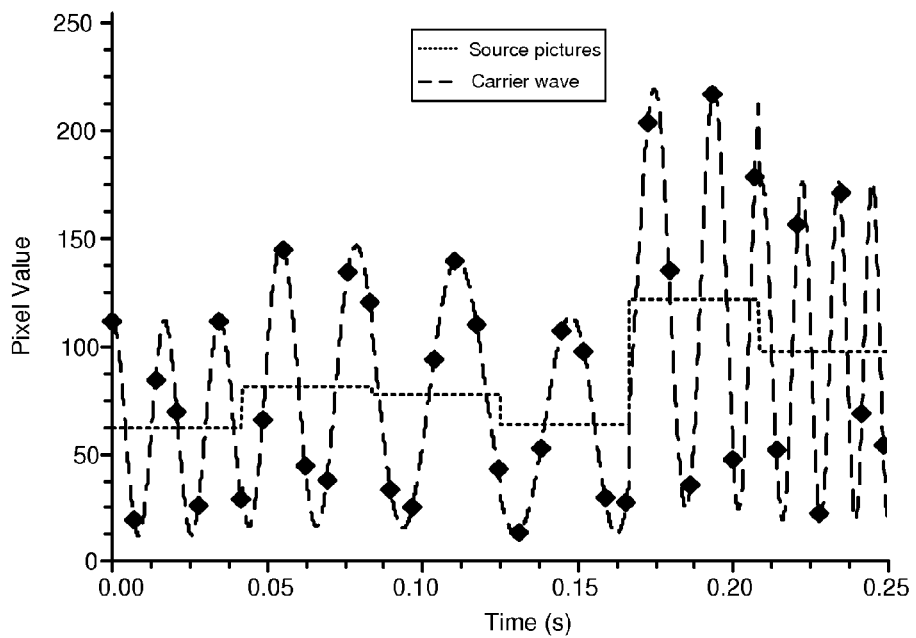
FIG. 5 illustrates the brightness of source pictures over time and the carrier wave used in a second embodiment of the invention.
Figure 6:
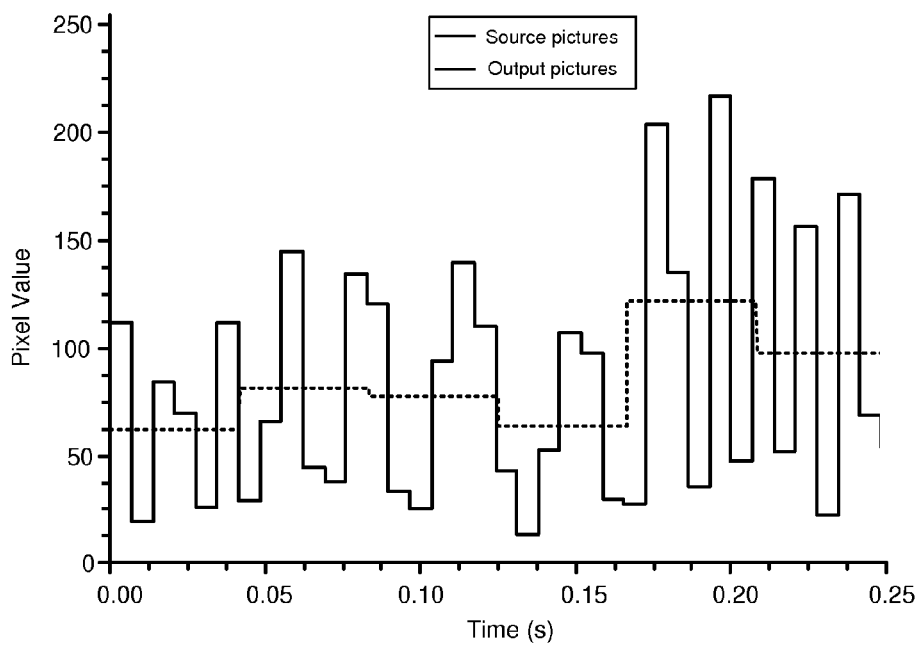
FIG. 6 shows the output pictures generated by using the carrier wave of FIG. 5.

In a second embodiment illustrated by FIGS. 5 and 6, the modulation frequency does not change periodically but progressively, for example, according a sine curve. The FIG. 5 shows the brightness (pixel value) of the source pictures over time and the carrier waves used to modulate the brightness of some pixels of the source pictures. The FIG. 6 shows the resulting output pictures for a refresh frequency (or picture frequency) $F_r'=144$ Hz. In these figures, $fm=fm_0 \cdot (1+0,2 \cdot \cos(2\pi vt))$ where v is the speed at which the modulation frequency fm varies and $fm_0$ is a central modulation frequency. The speed v is preferably low to have an appropriate bandwidth for the modulated signal (the frequency modulation can easily increase a signal's bandwidth and make it require higher refresh frequencies to be displayed without artifacts). In the FIGS. 5 and 6, v=Fr/8=3. Of course, the modulation frequency can change differently, for example in a linear way or randomly.

In order to get the highest effect (the highest amplitude of modulation for the samples), for each modulation frequency $fm_i$, it is advantageous to select a phase $\phi$ of the carrier wave, noted $\phi_{opt}$, that maximizes the carrier signal energy over the time period where the modulation frequency $fm_i$ is applied $$\varphi_{opt} = \underset{\varphi}{\operatorname{argmax}} \left( \sum_{k=1}^{K} \left\| \cos\left(2\pi \cdot k \cdot \frac{fm_i}{F_r'} + \varphi\right) \right\|^2 \right) \quad (3)$$

where $K=F_r'/F_r$

For example, if $fm_i=35$ Hz, $F_r=24$ Hz and $F_r'=144$ Hz, the optimal phase is $\phi_{opt}=2.22$ rad.

The anti-camcorder effect can be advantageously strengthened by normalizing the value of the $k^{th}$ sample by multiplying it by a normalization coefficient $C_{norm}(k)$ such as $$C_{norm}(k) = \frac{\cos\left(2\pi \cdot k \cdot \frac{fm_i}{F_r'} + \varphi_{opt}\right)}{\max_{i \in [1...K]}\left(\cos\left(2\pi \cdot k \cdot \frac{fm_i}{F_r'} + \varphi_{opt}\right)\right)}$$

This normalization allows that at least one sample of the K consecutives samples of the carrier wave reaches the maximum or the minimum brightness value (for example 255).

According to the invention, for a time period where the modulation frequency $fm_i$ is selected and for M source pictures I(n) with n∈[1,N], K×N output pictures $I_{out}$ are generated: for k∈[1,K], n∈[1,N], $$I_{out}((n-1)\cdot K + k) = I(n)\cdot\left(1 + m\cdot\frac{\cos\left(\frac{2\pi\cdot((n-1)\cdot K + k)\cdot \frac{fm_i}{F_r'} + \varphi_{opt}}\right)}{C_{norm}(k)}\right)$$

It can be noted that phase optimization and normalization only applies if a finite set of carrier coefficients $$\frac{\cos\left(2\pi \cdot ((n-1)\cdot K + k)\cdot \frac{fm_i}{F_r'} + \varphi_{opt}\right)}{C_{norm}(k)}$$

has been found. For hardware implementation purposes we will only use modulation frequencies that respect this condition and the set of coefficients will be stored in a Look-Up Table.

Figure 7:
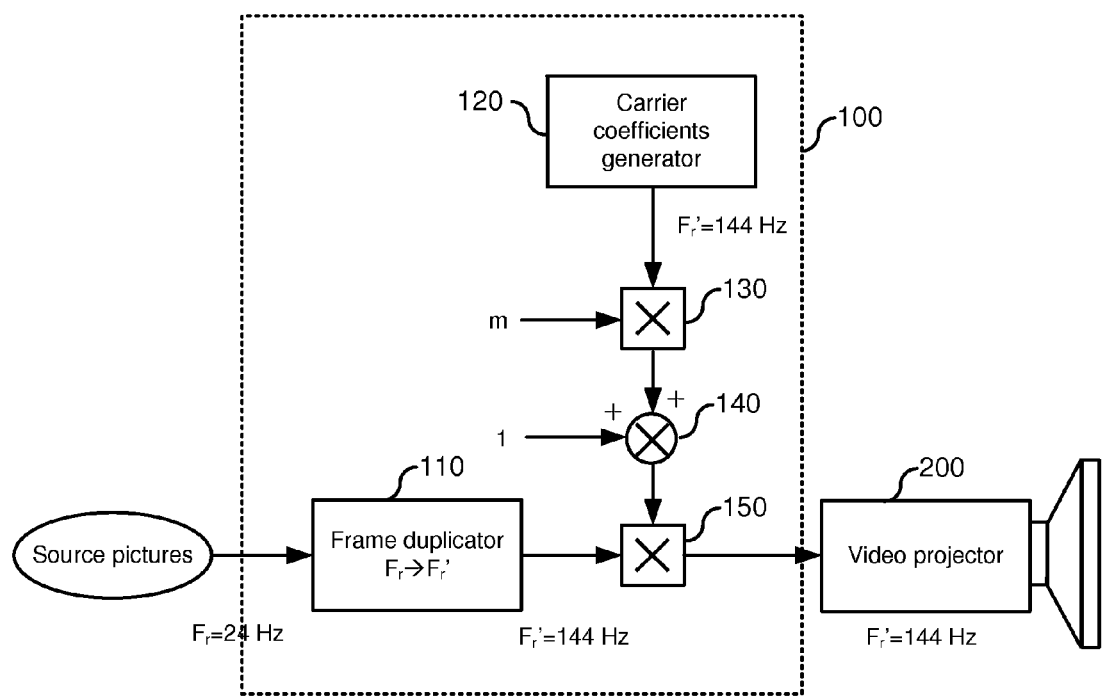
FIG. 7 shows a device for implementing the inventive method.

FIG. 7 shows a device 100 for implementing the inventive method. The device 100 receives source pictures and delivers output pictures to a video projector 200 working at a refresh frequency $F_r'$(=144 Hz for example). The source pictures are received at a refresh frequency $F_r$. The device comprises:
- a frame duplicator 110 which generates K pictures for each source picture, with $K=F_r'/F_r$,
- a generator 120 for generating carrier coefficients at a frequency $F_r'$; these carrier coefficients of type $$\frac{\cos\left(2\pi \cdot ((n-1)\cdot K + k)\cdot \frac{fm_i}{F_r'} + \varphi_{opt}\right)}{C_{norm}(k)}$$

are computed previously and stored in a look-up table;
- a first multiplier circuit 130 for multiplying the modulation index m with each carrier coefficient delivered by the generator 120; the modulation index is a predetermined value based on psychovisual tests;
- an adder circuit 140 for adding 1 to the value delivered by the multiplier circuit 130; and
- a second multiplier circuit 150 for multiplying the value delivered by the adder circuit 140 with the value of a number of pixels of the duplicated pictures to be modulated and delivered by the frame duplicator 110; the output pictures are provided to the video projector 200.

Of course, the scope of the present invention is not limited to the embodiments described hereinabove. More particularly, other values of refresh frequencies $F_r'$ and $F_r'$ or modulation frequencies $fm_i$ can be used. More than two modulation frequencies can be used.

The invention claimed is:

1. A method for processing a sequence of source video pictures by generating, from each source picture, at least two successive processed video pictures, in which the brightness of at least one pixel in the processed video pictures is modulated temporally around the brightness of the pixel in the source video picture by a carrier wave at a frequency called modulation frequency, the method comprising:
    alternately changing the modulation frequency between a first modulation frequency and a second modulation frequency at least once throughout the generation of the processed video pictures of the sequence, and
    selecting the first modulation frequency and the second modulation frequency to generate an aliasing at a frequency $f_a$ from two different pre-defined sampling frequencies of a video capturing device when the processed video pictures are captured by the video capturing device.

2. Method according to claim 1, wherein the modulation frequency changes periodically.

3. Method according to claim 2, wherein the modulation frequency changes at each period of N source video pictures with N≧1.

4. Method according to claim 3, wherein the modulation frequency changes at each period of N source pictures with N≧8.

5. Method according to claim 1, wherein the modulation frequency changes progressively according to a predefined variation speed.

6. Method according to claim 5, wherein the modulation frequency changes progressively following a sine curve.

7. Method according to claim 1, wherein the generation of processed pictures comprises
    duplicating each source video picture for generating, for each source video picture, at least two consecutive pictures identical to the source video picture, and
    modulating said at least two consecutive video pictures by the carrier wave.

8. Method according to claim 7, wherein the phase of the carrier wave, for each modulation frequency is selected in order to maximize the carrier wave energy over the time period where the modulation frequency of the carrier is said modulation frequency.

9. A device for processing a sequence of source pictures comprising a generator for generating, from each source video picture, at least two successive processed video pictures, in which the brightness of at least one pixel in the processed video pictures is modulated temporally around the brightness of the pixel in the source video picture by a carrier wave at frequency called modulation frequency,
    wherein said generator comprises means for alternately changing the modulation frequency between a first modulation frequency and a second modulation frequency at least once throughout the generation of the processed video pictures,
    wherein the first modulation frequency and the second modulation frequency are selected to generate an aliasing at a frequency $f_a$ for two different predefined sampling frequencies of a video capturing device when the processed video pictures are captured by said video capturing device.

* * * * *